US012105968B2

(12) United States Patent
Park et al.

(10) Patent No.: US 12,105,968 B2
(45) Date of Patent: Oct. 1, 2024

(54) SYSTEMS, METHODS, AND DEVICES FOR PAGE RELOCATION FOR GARBAGE COLLECTION

(71) Applicant: Samsung Electronics Co., Ltd., Suwon-si (KR)

(72) Inventors: Heekwon Park, San Jose, CA (US); Marie Mai Nguyen, Pittsburgh, PA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/504,495

(22) Filed: Oct. 18, 2021

(65) Prior Publication Data

US 2023/0019878 A1  Jan. 19, 2023

Related U.S. Application Data

(60) Provisional application No. 63/221,463, filed on Jul. 13, 2021.

(51) Int. Cl.
*G06F 3/06* (2006.01)
*G06F 12/08* (2016.01)
*G06F 12/0882* (2016.01)
*G06F 12/0891* (2016.01)

(52) U.S. Cl.
CPC .......... *G06F 3/0631* (2013.01); *G06F 3/0604* (2013.01); *G06F 3/064* (2013.01); *G06F 3/065* (2013.01); *G06F 3/0673* (2013.01); *G06F 12/0882* (2013.01); *G06F 12/0891* (2013.01)

(58) Field of Classification Search
CPC ...... G06F 3/0631; G06F 3/0604; G06F 3/064; G06F 3/065; G06F 3/0673; G06F 12/0882; G06F 12/0891
See application file for complete search history.

(56) References Cited

U.S. PATENT DOCUMENTS

| | | | |
|---|---|---|---|
| 10,198,211 B2 | 2/2019 | Chung et al. | |
| 10,977,142 B2* | 4/2021 | Blea | G06F 3/067 |
| 2017/0228191 A1 | 8/2017 | Sun et al. | |
| 2018/0088811 A1* | 3/2018 | Kanno | G06F 3/0679 |
| 2018/0307598 A1 | 10/2018 | Fischer et al. | |
| 2018/0321962 A1* | 11/2018 | Peddamallu | G06F 11/1441 |
| 2019/0129815 A1* | 5/2019 | Gao | G06F 11/3034 |
| 2019/0356736 A1* | 11/2019 | Narayanaswamy | G06F 11/1076 |

(Continued)

*Primary Examiner* — Masud K Khan
(74) *Attorney, Agent, or Firm* — Renaissance IP Law Group LLP

(57) ABSTRACT

A method for page management in a memory system may include allocating a page of a mirror memory, copying a valid page from a block of device memory at a device to the page of the mirror memory, remapping the valid page from the block of device memory to the mirror memory, and modifying the block of device memory. The method may further include copying the valid page from the mirror memory to a free page at the device, and remapping the valid page from the mirror memory to the free page at the device. The remapping may be performed using a memory coherent interface. The method may further include deallocating a portion of the mirror memory associated with the valid page based on copying the valid page from the mirror memory.

19 Claims, 13 Drawing Sheets

(56) References Cited

U.S. PATENT DOCUMENTS

| | | |
|---|---|---|
| 2020/0356271 A1 | 11/2020 | Kanno |
| 2021/0011864 A1 | 1/2021 | Guim Bernat et al. |
| 2021/0055990 A1 | 2/2021 | Iwasaki et al. |
| 2021/0064293 A1* | 3/2021 | Cho .................. G06F 3/0673 |
| 2021/0318830 A1* | 10/2021 | Jones ................ G06F 3/0619 |

* cited by examiner

SYSTEMS, METHODS, AND DEVICES FOR PAGE RELOCATION FOR GARBAGE COLLECTION

CROSS-REFERENCE TO RELATED APPLICATIONS

This application claims priority to, and the benefit of, U.S. Provisional Patent Application Ser. No. 63/221,463 titled "Systems, Methods, and Apparatus for Valid Page Relocation for Garbage Collection" filed Jul. 13, 2021 which is incorporated by reference.

TECHNICAL FIELD

This disclosure relates generally to memory systems, and more specifically to systems, methods, and devices for page relocation for garbage collection.

BACKGROUND

A storage device based on nonvolatile memory may accumulate invalid pages of data during normal operation. These invalid pages may be erased to make them available for reuse. However, some nonvolatile memory may only be erased at the level of blocks that include multiple pages, some of which may be valid pages. Therefore, before erasing a block, the storage device may perform a garbage collection process in which valid pages from a first block may be moved to a reserved block. The first block may then be erased to make its pages available for reuse.

The above information disclosed in this Background section is only for enhancement of understanding of the background of the invention and therefore it may contain information that does not constitute prior art.

SUMMARY

A method for page management in a memory system may include allocating a page of a mirror memory, copying a valid page from a block of device memory at a device to the page of the mirror memory, remapping the valid page from the block of device memory to the mirror memory, and modifying the block of device memory. The method may further include copying the valid page from the mirror memory to a free page at the device, and remapping the valid page from the mirror memory to the free page at the device. The remapping may be performed using a memory coherent interface. The method may further include deallocating a portion of the mirror memory associated with the valid page based on copying the valid page from the mirror memory. The method may further include updating the valid page in the mirror memory to generate a dirty page in the mirror memory, copying the dirty page from the mirror memory to a free page at the device, and remapping the dirty page to the free page at the device. The method may further include redirecting, from the block of device memory to the mirror memory, a request for the valid page based on the remapping. The valid page may be associated with a process at a host, the method may further include deallocating, by the process, the valid page from the mirror memory. The mirror memory may include system memory. The device may be a first device, and the mirror memory may include a memory at a second device. The valid page may include a valid page of a first memory of a first processing element of the device, and the mirror memory may include a second memory of a second processing element of the device. The allocating may be based on an indication from the device. The indication may include an interrupt from the device to a device driver.

A system may include a storage device may include a block of memory, modification logic configured to send a notification based on a valid page and an invalid page in the block of memory, receive an indication, and modify the block of memory based on the indication, a mirror memory, and relocation logic configured to receive the notification from the modification logic, copy the valid page to the mirror memory based on the notification, remap the valid page to the mirror memory, and send the indication to the modification logic. The modification logic may be further configured to send a valid page list to the relocation logic, and the relocation logic may be further configured to copy the valid page from the mirror memory to a free page at the storage device based on the valid page list, and remap the valid page from the mirror memory to the free page at the storage device. The system may further include a device driver configured to copy the valid page from the block of memory to the mirror memory, and copy the valid page from the mirror memory to the free page of the storage device. The system may further include a memory allocator configured to redirect, based on the notification, a memory allocation for a processing element of the storage device associated with the block of memory, and provide to the storage device, based on the notification, a list of pages allocated to the processing element of the storage device.

A storage device may include a block of memory, and modification logic configured to send a notification based on a valid page and an invalid page in the block of memory, receive an indication, and perform a modification operation on the block of memory based on the indication. The modification logic may be configured to communicate with a host using a coherent memory interface. The modification logic may be configured to send a valid page list based on the modification operation. The block of memory may be a first block of memory, the storage device may include a first processing element configured to control the first block of memory and a second block of memory, and a second processing element configured to control a third block of memory, and the modification logic may be configured to perform, by the first processing element, the modification operation on the first block of memory and the second block of memory based on the indication.

A method for garbage collection in a memory system may include relocating a valid page from a block of memory at a device to a mirror memory, performing a garbage collection operation on the block of memory at the device based on the relocating, and copying the valid page from the mirror memory to a free page at the device. The method may further include redirecting a request for the valid page to the mirror memory. The relocating may include copying the valid page from the block of memory at the device to the mirror memory, and remapping the valid page to the mirror memory. The method may further include sending a valid page list from the device to a host, wherein copying the valid page from the mirror memory to a free page at the device may be based on the valid page list.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
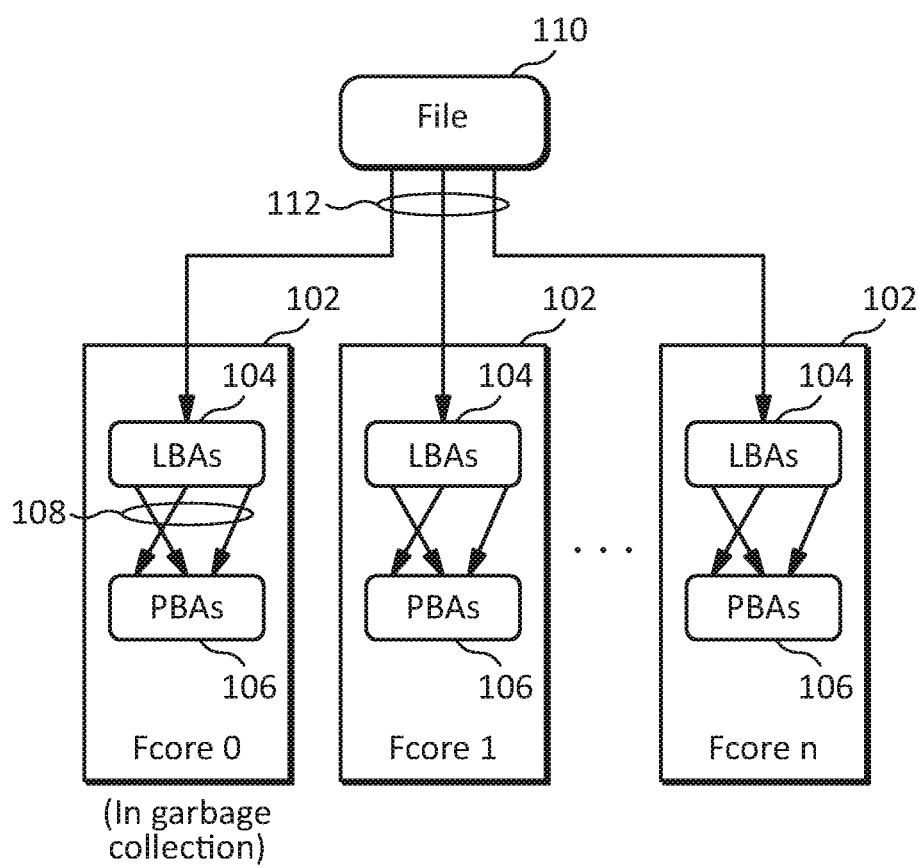
FIG. 1 illustrates an embodiment of a page mapping scheme for a garbage collection mechanism for a block-based storage device in accordance with example embodiments of the disclosure.

During a garbage collection process in a memory system, one or more valid pages of device memory may be copied from a first block to a reserved block so the first block may be modified (e.g., erased). This may increase a tail latency because the valid page may not be available for a memory access during the garbage collection process. Moreover, reserving a block of memory for a garbage collection process may reduce the overall storage capacity and/or utilization of the memory system.

In a memory system in accordance with example embodiments of the disclosure, one or more valid pages in a block of device memory may be relocated to a mirror memory while the device performs a garbage collection operation on the block of device memory. This may improve utilization of the device memory, for example, by freeing up reserved memory space that may no longer be needed for garbage collection.

In some embodiments, a mirror memory may refer to any memory that may be used to store a copy (which may also be referred to as a duplicate) of a page of device memory during a garbage collection process. A mirror memory may be located, for example, at a host, another device, a different memory core within the device and/or the like. In some embodiments, mirroring (which may also be referred to as relocating) a page of device memory may refer to copying (which may also be referred to as duplicating) the page of device memory to a mirror memory.

In some embodiments, a request (e.g., a read or write request) for the valid page may be redirected while the page is in the mirror memory during a garbage collection operation. This may reduce tail latency, for example, because the request may be handled by a host during the garbage collection operation rather than waiting for the device to complete the garbage collection operation.

A garbage collection method in accordance with example embodiments of the disclosure may begin when a storage device notifies a host of an intention to initiate a garbage collection operation based on accumulating one or more invalid pages in a block of device memory that may also include one or more valid pages. Based on the notification, the host may relocate the one or more valid pages by mirroring the one or more valid pages to a mirror memory. The one or more valid pages may be mirrored, for example, by copying and remapping the one or more valid pages to a mirror memory. After the valid pages have been relocated, the host may notify the device which may then proceed with the garbage collection operation. Because the one or more valid pages have been relocated, the storage device may implement the garbage collection operation by erasing the block without copying valid pages to a reserved space. This may reduce device complexity and/or power consumption by reducing or eliminating valid page copying within the device.

In some embodiments, during the garbage collection operation, the host may handle one or more requests for the valid pages in the mirror memory. This may result in a dirty page if a page is updated (e.g., written) during the garbage collection operation. After the garbage collection operation is completed, the device may send the host a list of valid page frame numbers for the erased block. The host may then copy back one or more dirty pages and/or one or more valid pages of the erased block to the storage device.

Depending on the implementation details, relocating a valid page may reduce garbage collection overhead and/or the complexity of interactions between a host and a device, for example, in an architecture based on a memory coherent interconnect.

For purposes of illustration, some embodiments may be described in the context of one or more storage devices implemented as solid state drives (SSDs) with flash memory storage media. The principles of this disclosure, however, may be implemented with any type of storage device using any type of storage media including any other type of solid state media, magnetic media, optical media, and/or the like. For example, in some embodiments, a storage device may be implemented as an SSD based on not-AND (NAND) flash memory, persistent memory such as cross-gridded nonvolatile memory, memory with bulk resistance change, phase change memory (PCM) and/or the like, and/or any combination thereof.

Any of the storage devices disclosed herein may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached SCSI (SAS), U.2, and/or the like.

Any of the storage devices disclosed herein may be implemented entirely or partially with, and/or used in connection with, a server chassis, server rack, dataroom, datacenter, edge datacenter, mobile edge datacenter, and/or any combinations thereof.

Any of the storage devices disclosed herein may communicate through any interfaces and/or protocols including Peripheral Component Interconnect Express (PCIe), Nonvolatile Memory Express (NVMe), NVMe-over-fabric (NVMe-oF), Ethernet, Transmission Control Protocol/Internet Protocol (TCP/IP), remote direct memory access (RDMA), RDMA over Converged Ethernet (ROCE), FibreChannel, InfiniBand, Serial ATA (SATA), Small Computer Systems Interface (SCSI), Serial Attached SCSI (SAS), iWARP, and/or the like, or any combination thereof.

FIG. 1 illustrates an embodiment of a page mapping scheme for a garbage collection mechanism for a block-based storage device in accordance with example embodiments of the disclosure. For purposes of illustration, the embodiment illustrated in FIG. 1 may be described in the context of a storage device implemented as an SSD 100 having multiple storage cores implemented as flash cores 102 indicated as Fcore 0, Fcore 1, . . . Fcore n. Each flash core 102 may control one or more channels, each having one or more blocks of flash memory. One or more of the flash cores 102 may implement a logical-to-physical (L2P) mapping mechanism in which one or more logical block addresses (LBAs) 104 may be mapped to one or more physical block addresses (PBAs) as indicated by L2P mapping 108. A file 110 may be stored, based on a mapping 112, in one or more of the flash cores 102, as well as the corresponding channels, blocks and/or pages of the SSD 100.

In some embodiments, an SSD may not perform in-place updates (e.g., may not rewrite a page that has previously been written until a block containing the page is erased). Thus, to update a valid page (e.g., a page that an application may be actively using), the SSD may allocate a new page, write the updated data to the new page, and mark the previously written page as invalid. The invalid page may eventually be erased during a garbage collection process.

During a garbage collection process, a flash core 102 (in this example, Fcore 0) may erase one or more blocks of memory, each of which may contain one or more valid pages of memory, and one or more invalid pages of memory. To prevent the erasure of valid data, the one or more valid pages in a block to be erased may be moved to a clean block (e.g., a block that may include only blank and/or valid pages). Thus, the L2P mapping 108 may be changed during a garbage collection process to keep track of the new location (s) of the one or more valid pages. However, because copies of the valid pages at the new location(s) may be the only copies after the page is erased, a copy of the mapping 108 may need to be retained. Moreover, the mapping 112 of the file to the SSD 100 may remain unchanged.

Figure 2:
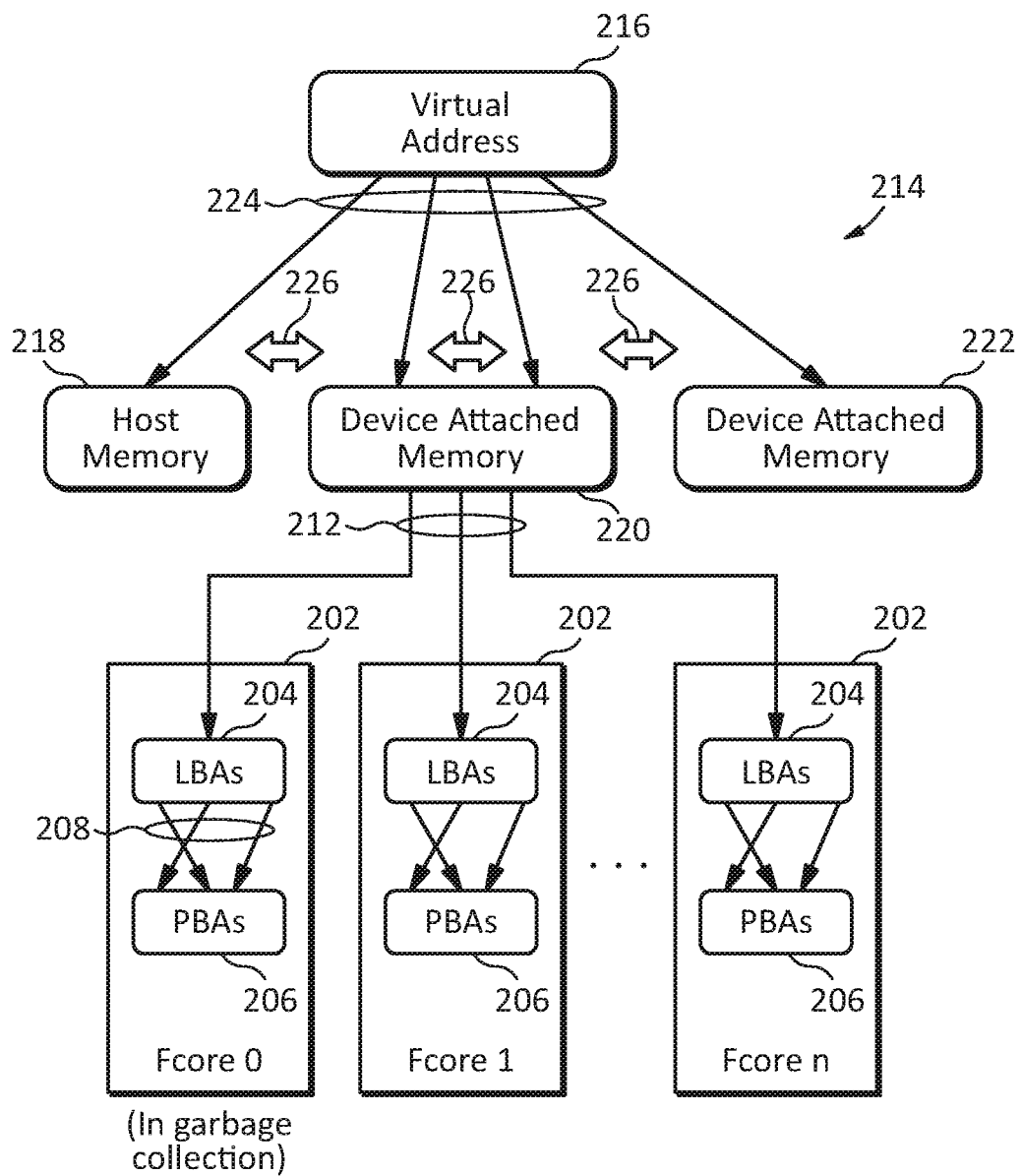
FIG. 2 illustrates an embodiment of a page mapping scheme for a garbage collection mechanism for a storage device with page relocation in accordance with example embodiments of the disclosure.

FIG. 2 illustrates an embodiment of a page mapping scheme for a garbage collection mechanism for a storage device with page relocation in accordance with example embodiments of the disclosure. In the embodiment illustrated in FIG. 2, a storage device may be implemented as an SSD 200 having multiple storage cores implemented as flash cores 202 indicated as Fcore 0, Fcore 1, . . . Fcore n. Each flash core 202 may control one or more channels, each having one or more blocks of flash memory. One or more of the flash cores 202 may implement a logical-to-physical (L2P) mapping mechanism in which one or more logical block addresses (LBAs) 204 may be mapped to one or more physical block addresses (PBAs) 206 as indicated by L2P mapping 208.

In the embodiment illustrated in FIG. 2, the storage media (in this example, flash memory) may be accessible to a virtual addressing scheme, for example, through a memory semantic and/or memory coherent interface such as Compute Express Link (CXL), and using a memory coherent protocol such as CXL.mem. However, embodiments may also be implemented with any other interfaces and/or protocols including cache coherent and/or memory semantic interfaces and/or protocols such as Gen-Z, Coherent Accelerator Processor Interface (CAPI), Cache Coherent Interconnect for Accelerators (CCIX), and/or the like.

In the virtual addressing scheme 214, one or more virtual addresses 216 may be mapped to various memories such as host memory 218 (e.g., dynamic random access memory (DRAM)), device attached memories 220 and 222, and/or the like through a mapping 224. The Fcores 202 and their corresponding channels, blocks and/or pages may be mapped to the device attached memory 220 by a static mapping 212. In some embodiments, a valid page may refer to a page that an application may be actively using, and thus, an application virtual address for the page may be mapped, for example, to one or more of the devices 202 and/or PBAs 206.

In preparation for a garbage collection operation by one of the flash cores 202 (in this example, Fcore 0), the virtual addressing scheme 214 may copy one or more valid pages (e.g., pages that an application may be actively using) between the memories as shown by arrows 226 and change the mapping 224 accordingly. For example, one or more valid pages mapped to a block to be erased by Fcore 0 may be copied and remapped to the host memory 218. Because the remapping and/or copying operations by the virtual addressing scheme 214 may keep track of the valid pages in the block to be erased, the L2P mapping 208 (e.g., for the valid pages) may simply be removed, and no copy may be needed. After the garbage collection operation is completed, the one or more valid pages may be copied and remapped back to Fcore 0 or any other Fcore 202.

Thus, depending on the implementation details, the embodiment illustrated in FIG. 2 may take advantage of the two-level indirection of the virtual memory management scheme 214 and the L2P mapping 208 to implement various features such as page relocation that may reduce tail latency during garbage collection.

Figure 3:
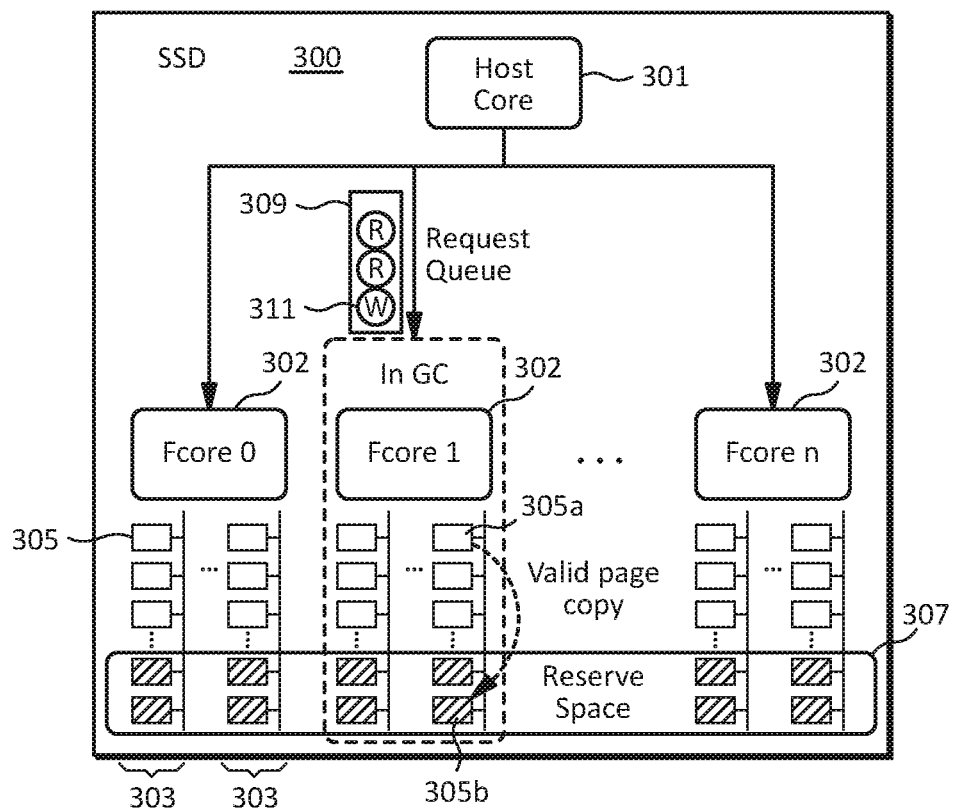
FIG. 3 illustrates an embodiment of a garbage collection mechanism for a block-based storage device.

FIG. 3 illustrates an embodiment of a garbage collection mechanism for a block-based storage device. The embodiment illustrated in FIG. 3 may implement, for example, a page mapping scheme such as that illustrated in FIG. 1.

Referring to FIG. 3, the storage device may be implemented as an SSD 300 having a host core 301 and one or more flash cores 302. The host core 301 may interface the SSD 300 to a host through any suitable interface. The one or more flash cores 302 may each control one or more flash channels 303, each of which may include one or more blocks of memory 305. A portion of memory space for one or more of the flash channels 303 may be set aside as reserved space 307 for use during garbage collection.

At the beginning of a garbage collection operation, one of the flash cores 302 (in this example, Fcore 1) may copy one or more valid pages from a block to be erased 305a to a clean block 305b in the reserved space 307. The SSD 300 may change the L2P mapping of the one or more valid pages to reflect the new location(s). Fcore 1 may then erase the block 305a, and return it to a pool of blocks with blank pages.

During the garbage collection operation, because Fcore 1 may not be able to process requests for any of the pages in its blocks, requests 311 for pages controlled by Fcore 1 may be queued in a pending request queue 309 wherein "R" may indicate a pending read request and "W" may indicate a pending write request. The pending requests 311 may be processed after the garbage collection operation is completed.

Thus, in the embodiment illustrated in FIG. 3, the reserved memory space 307 may reduce the overall memory utilization of the SSD 300. Moreover, queueing the requests 311 during the garbage collection operation may cause a tail latency.

Figure 4:
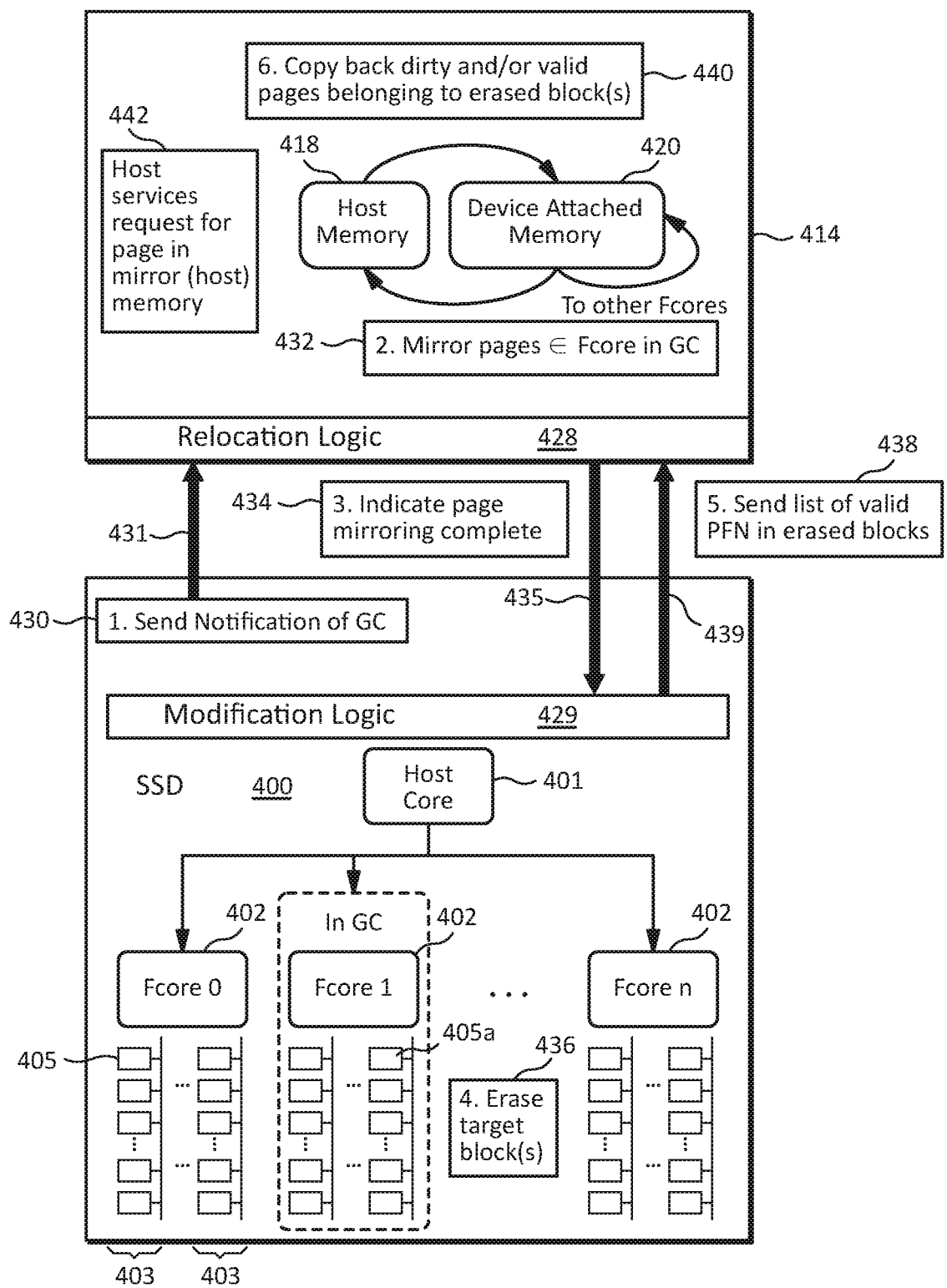
FIG. 4 illustrates an embodiment of a garbage collection mechanism for a block-based storage device having page relocation in accordance with example embodiments of the disclosure.

FIG. 4 illustrates an embodiment of a garbage collection mechanism for a block-based storage device having page relocation in accordance with example embodiments of the disclosure. The embodiment illustrated in FIG. 4 may implement, for example, a page mapping scheme such as that illustrated in FIG. 2.

Referring to FIG. 4, the storage device may be implemented as an SSD 400 having one or more host cores 401 and one or more flash cores 402. The host core 401 may interface the SSD 400 to a host through any suitable interface. In the embodiment illustrated in FIG. 4, the SSD may be interfaced to a virtual memory scheme 414 through a memory coherent interface such as CXL, and/or using a memory coherent protocol such as CXL.mem. The virtual memory scheme 414 may include a host memory (e.g., system memory) 418 and/or one or more device attached memories (e.g., device attached memory 420). In this example, the device attached memory 420 may correspond to the SSD 400.

The one or more flash cores 402 may each control one or more flash channels 403, each of which may include one or more blocks of memory 405.

A garbage collection operation may begin at an operation 430 when modification logic 429 at the SSD 400 sends a notification 431 to relocation logic 428 indicating that one of the flash cores 402 (in this example, Fcore 1), intends to perform a garbage collection operation based, for example, on a target block 405a having one or more invalid pages and one or more valid pages. In some embodiments, the notification 431 may be implemented, for example, as an interrupt (e.g., a hardware interrupt) to a device driver at the host.

In response to the notification 431, at a second operation 432, the relocation logic 428 may mirror one or more allocated pages, which may include one or more valid pages, in the block to be erased to a mirror memory. The mirror memory may be located in any suitable location such as host memory 418 and/or memory associated with one of the other Fcores 402 in device attached memory 420. At a third operation 434, the relocation logic may send an indication 435 to the modification logic 429 that the mirroring operation is completed and Fcore 1 may begin erasing the target block 305a.

In some embodiments, at an operation 442, a host or other apparatus may handle one or more requests for one or more valid pages in a mirror memory belonging to Fcore 1 while Fcore 1 is unavailable because of the garbage collection operation. This may include, for example, during any of the first through sixth operations 430, 432, 434, 436, 438, and/or 440. If a requested page has not been migrated (e.g., mirrored) to host memory 418 or other device attached memory, the request may be serviced from device attached memory 420. If migration (e.g., mirroring) of the requested page has been completed (e.g., the data copying and/or the virtual to physical memory mapping update has been completed), the request may be serviced by the host (e.g., at 442).

The handling of requests may be controlled and/or coordinated, for example, by the relocation logic 428. If a valid page in a mirror memory is updated (e.g., written) during the garbage collection operation, it may result in a dirty page.

At a fourth operation 436, in response to the indication 435, Fcore 1 may erase the target block 405a. Depending on the implementation details, Fcore 1 may erase the target block 405a without using reserved space, without copying any valid pages to a clean block, and/or without queueing any requests for one or more valid pages in the target block.

At a fifth operation 438, after the target block 305a is erased, the modification logic 429 may send a list 439 of valid page frame numbers (PFNs) in the erased block 305a to the relocation logic 428. At a sixth operation 440, the relocation logic 428 may copy back one or more dirty pages and/or valid pages belonging to the erased target block 405a, as indicated, for example, by the list 439.

In some embodiments, one or more valid pages may be relocated from a target block that may not be erased during the garbage collection operation. For example, a block may have no invalid pages or a small number of invalid pages, and therefore, the block may not be erased during the garbage collection operation. In this situation, the one or more valid pages relocated from the block that was not erased may not be copied back to the device, and in some embodiments, the valid pages may be remapped back to the block that was not erased in the device.

Depending on the implementation details, the embodiment illustrated in FIG. 4 may improve overall performance of a storage device (e.g., a storage device using a CXL interface), for example by reducing garbage collection overhead and/or complexity, and/or by reducing or eliminating tail latency caused by garbage collection operation.

Figure 5:
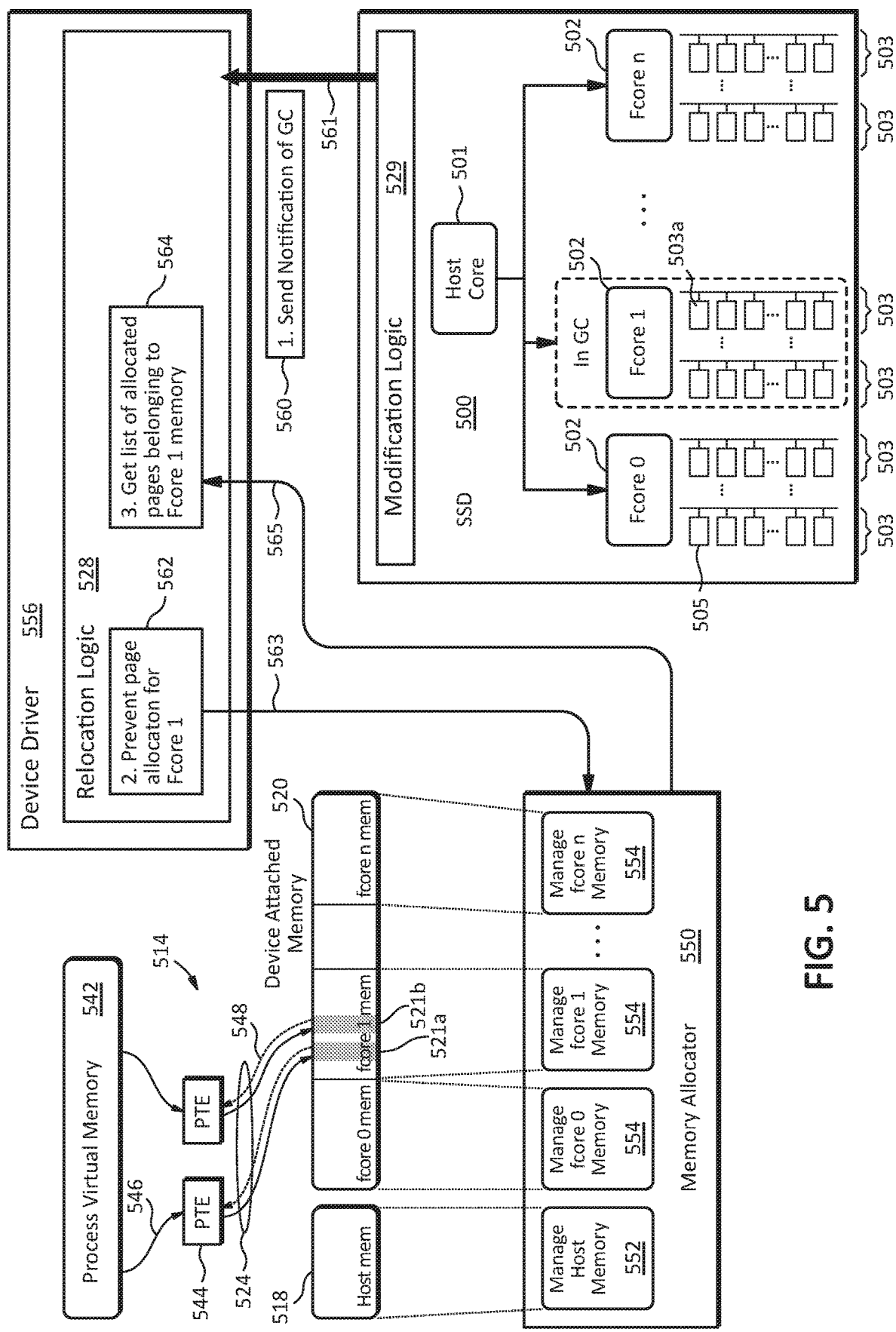
FIG. 5 illustrates an example embodiment of a system, and a first portion of an example embodiment of a garbage collection operation for the system, in accordance with example embodiments of the disclosure.

FIG. 5 illustrates an example embodiment of a system, and a first portion of an example embodiment of a garbage collection operation for the system, in accordance with example embodiments of the disclosure.

Figure 6:
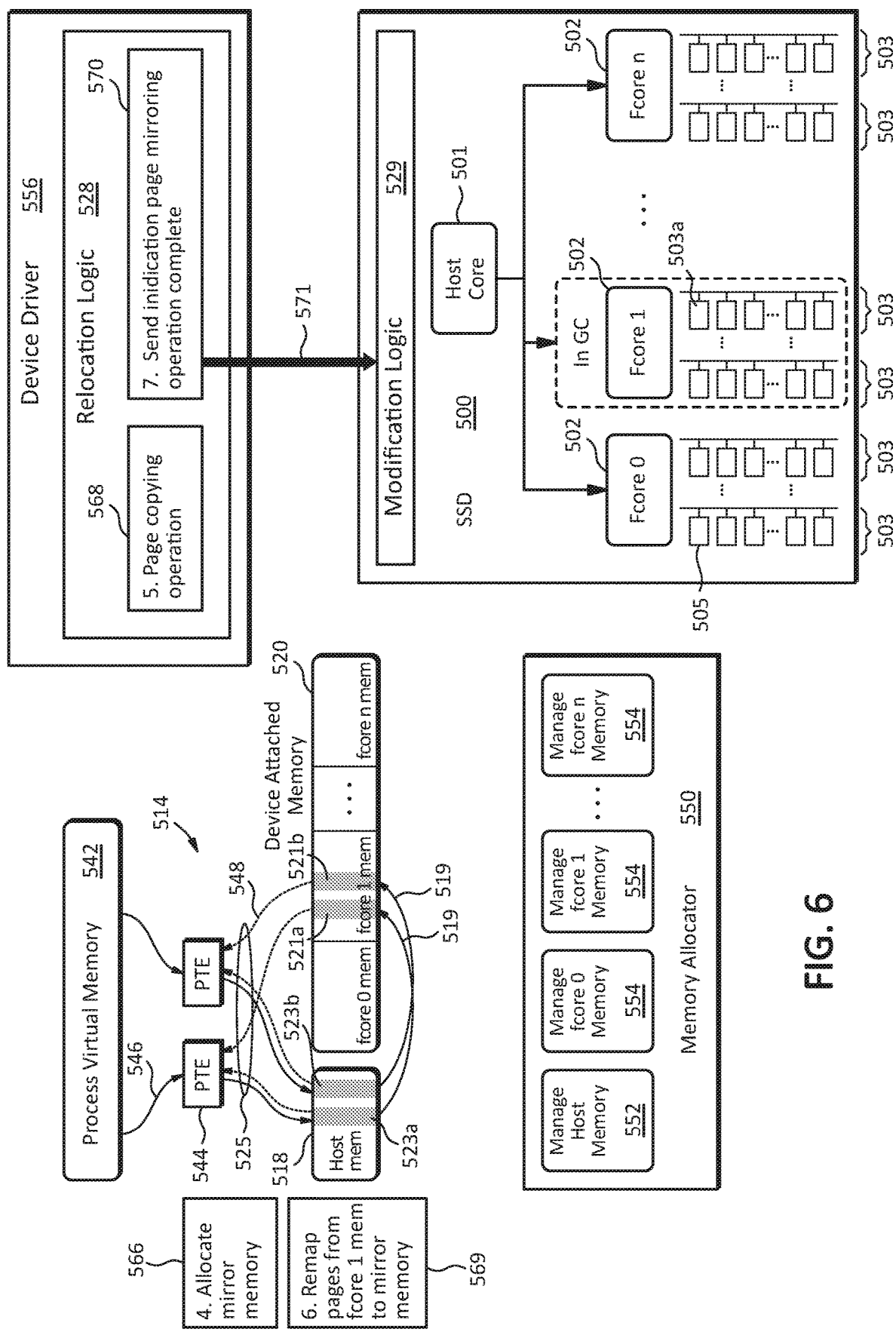
FIG. 6 illustrates an example embodiment of a system, and a second portion of an example embodiment of a garbage collection operation for the system, in accordance with example embodiments of the disclosure.

FIG. 6 illustrates an example embodiment of a system, and a second portion of an example embodiment of a garbage collection operation for the system, in accordance with example embodiments of the disclosure.

Figure 7:
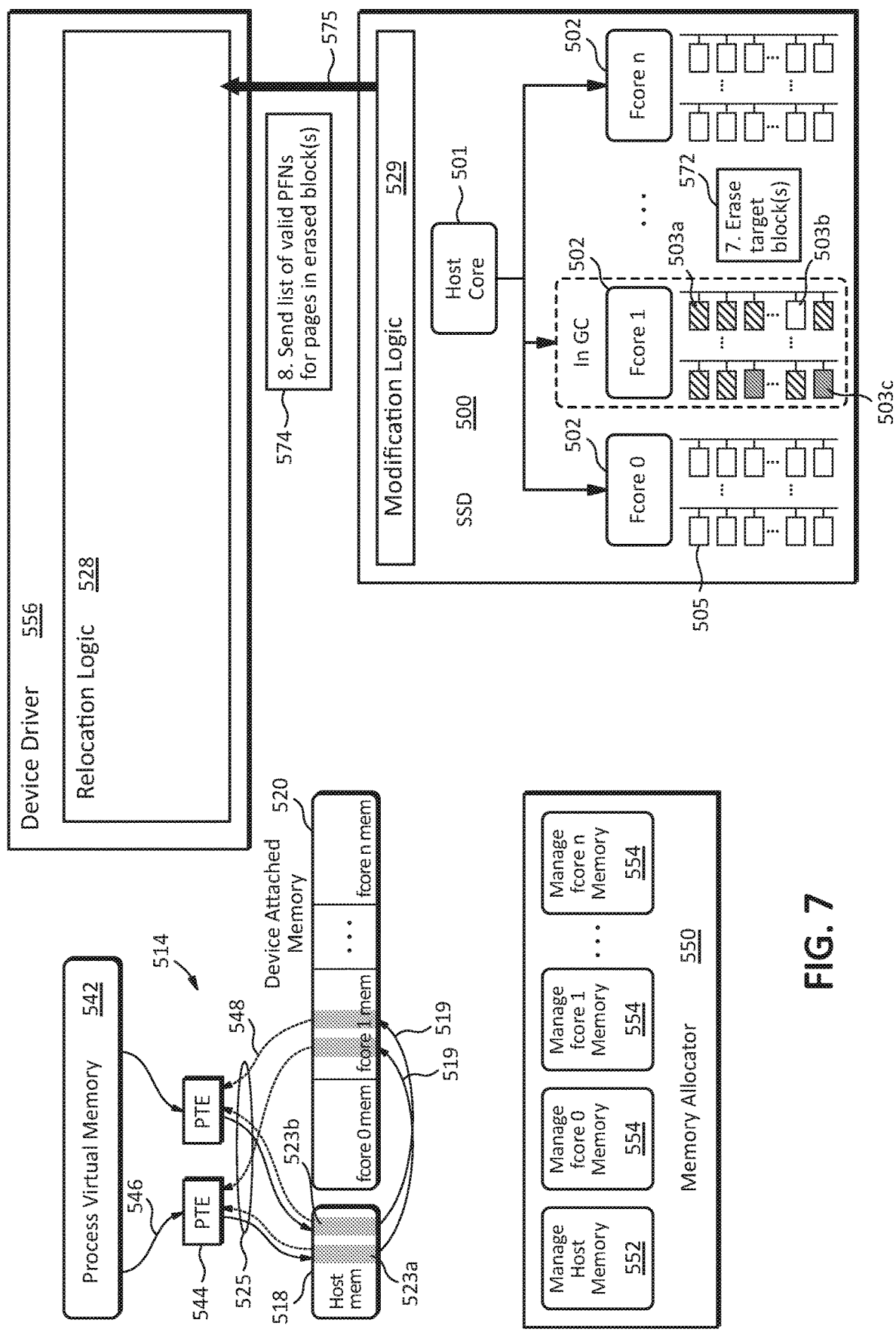
FIG. 7 illustrates an example embodiment of a system, and a third portion of an example embodiment of a garbage collection operation for the system, in accordance with example embodiments of the disclosure.

FIG. 7 illustrates an example embodiment of a system, and a third portion of an example embodiment of a garbage collection operation for the system, in accordance with example embodiments of the disclosure.

Figure 8:
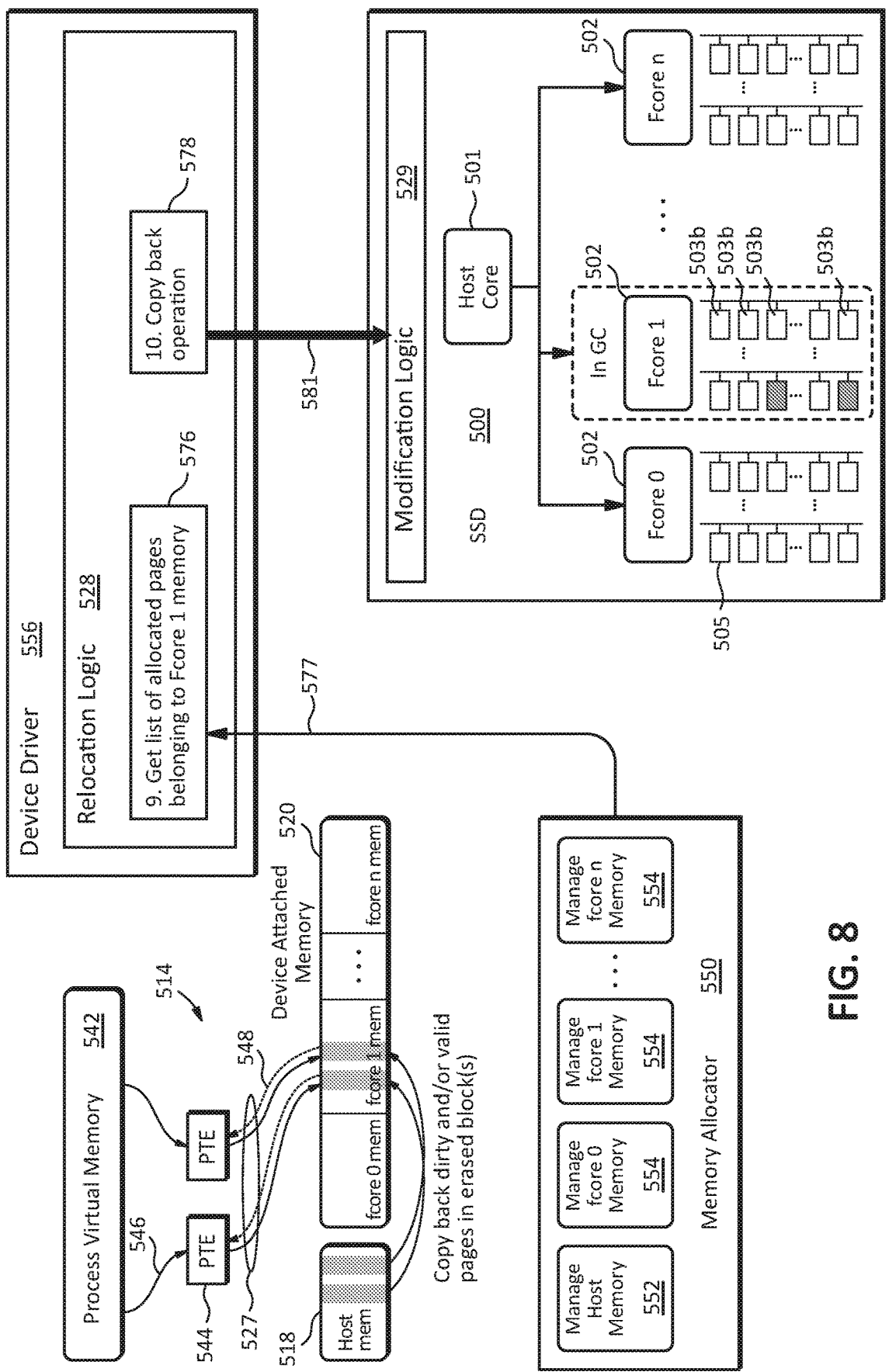
FIG. 8 illustrates an example embodiment of a system, and a fourth portion of an example embodiment of a garbage collection operation for the system, in accordance with example embodiments of the disclosure.

FIG. 8 illustrates an example embodiment of a system, and a fourth portion of an example embodiment of a garbage collection operation for the system, in accordance with example embodiments of the disclosure.

Collectively, FIG. 5, FIG. 6, FIG. 7, and FIG. 8 illustrate an example embodiment of a system, and an example embodiment of a garbage collection operation for the system, in accordance with example embodiments of the disclosure.

Referring to FIG. 5, the system may include an SSD 500 having a host core 501 and one or more flash cores 502. The host core 501 may interface the SSD 500 to a host through any suitable interface. In the embodiment illustrated in FIG. 5, the SSD may be interfaced to a virtual memory scheme 514 through a memory coherent interface such as CXL, and/or using a memory coherent protocol such as CXL.mem. The virtual memory scheme 514 may include a host memory (e.g., system memory which may be implemented, for example, with DRAM) 518 and/or one or more device attached memories (e.g., device attached memory 520). In this example, the device attached memory 520 (which may also be referred to as device memory) may correspond to the SSD 500. The device attached memory 520 may include one or more portions indicated as fcore 0 mem, fcore 1 mem, . . . fcore n mem, corresponding to the one or more flash cores Fcore 0, Fcore 1, . . . Fcore n, respectively.

The one or more flash cores 502 may each control one or more flash channels 503, each of which may include one or more blocks of memory 505. The SSD 500 may further include modification logic 529 that may control one or more functions of the block erase and/or garbage collection operations at the SSD 500.

The virtual memory scheme 514 may include process virtual memory 542 used by one or more host processes and mapped to the physical host memory 518 and device attached memory 520 using page table entries (PTEs) 544. Virtual to physical mapping is indicated by solid arrows, an example of which is shown as 546, and reverse mapping is indicated by dashed arrows, an example of which is shown as 548.

A memory allocator 550 may include memory management section 552 for allocating the host memory 518 and one or more memory management sections 554 for allocating the portions fcore 0 mem, fcore 1 mem, . . . fcore n mem of the device attached memory 520. A device driver 556 may implement one or more portions of the page relocation functionality described herein. In some embodiments, the device driver may be implemented partially or entirely as a CXL.io device driver. The device driver 556 may include relocation logic 528 which may also implement one or more portions of the page relocation functionality described herein. For example, the relocation logic may perform an overall supervisory function over an entire page relocation and/or garbage collection operation, which may include exercising control over the virtual memory scheme 514, the memory allocator 550, the device driver 556, the SSD 500, and/or the like.

In some embodiments, one or more of the process virtual memory 542, PTEs 544, host memory 518, memory allocator 550, device driver 556, and/or relocation logic 528 may be implemented at a host. Any of these components may be integrated into single components and/or split into separate components. For example, although the relocation logic 528 is shown as a part of the device driver 556, it may also be implemented as a partially or completely separate component. As another example, the relocation logic 528 may be partially or completely integrated into the memory allocator 550.

One or more pages of process virtual memory 542 may initially be mapped to the fcore 0 mem portion of the device attached memory 520. In the example illustrated in FIG. 5, the multiple pages of process virtual memory may be mapped to regions 521a and 521b of the device attached memory 520 as shown by mapping 524.

A garbage collection operation may begin at a first operation 560 when modification logic 529 at the SSD 500 sends a notification 561 to relocation logic 528 (e.g., through device driver 556) indicating that one of the flash cores 502 (in this example, Fcore 1), intends to perform a garbage collection operation based, for example, on one or more target blocks 503a having one or more invalid pages and one or more valid pages. In some embodiments, the notification 561 may be implemented, for example, as an interrupt (e.g., a hardware interrupt) to the device driver 556.

At a second operation 562, the relocation logic 528 may send a command, signal, message, and/or the like 563 to prevent the memory allocator 550 from allocating any pages for Fcore 1 (e.g., fcore 1 mem) while Fcore 1 is busy with the garbage collection operation.

At a third operation 564, the relocation logic 528 may obtain a list of allocated pages belonging to Fcore 1 as indicated by arrow 565.

Referring to FIG. 6, the garbage collection operation may continue at a fourth operation 566 where the relocation logic 528 may direct the virtual memory scheme 514 and memory allocator 550 to begin a mirroring operation by allocating pages of mirror memory 523a and 523b (which in this example may be in the host memory 518) for the valid pages 521a and 521b currently mapped to Fcore 1.

Figure 9:
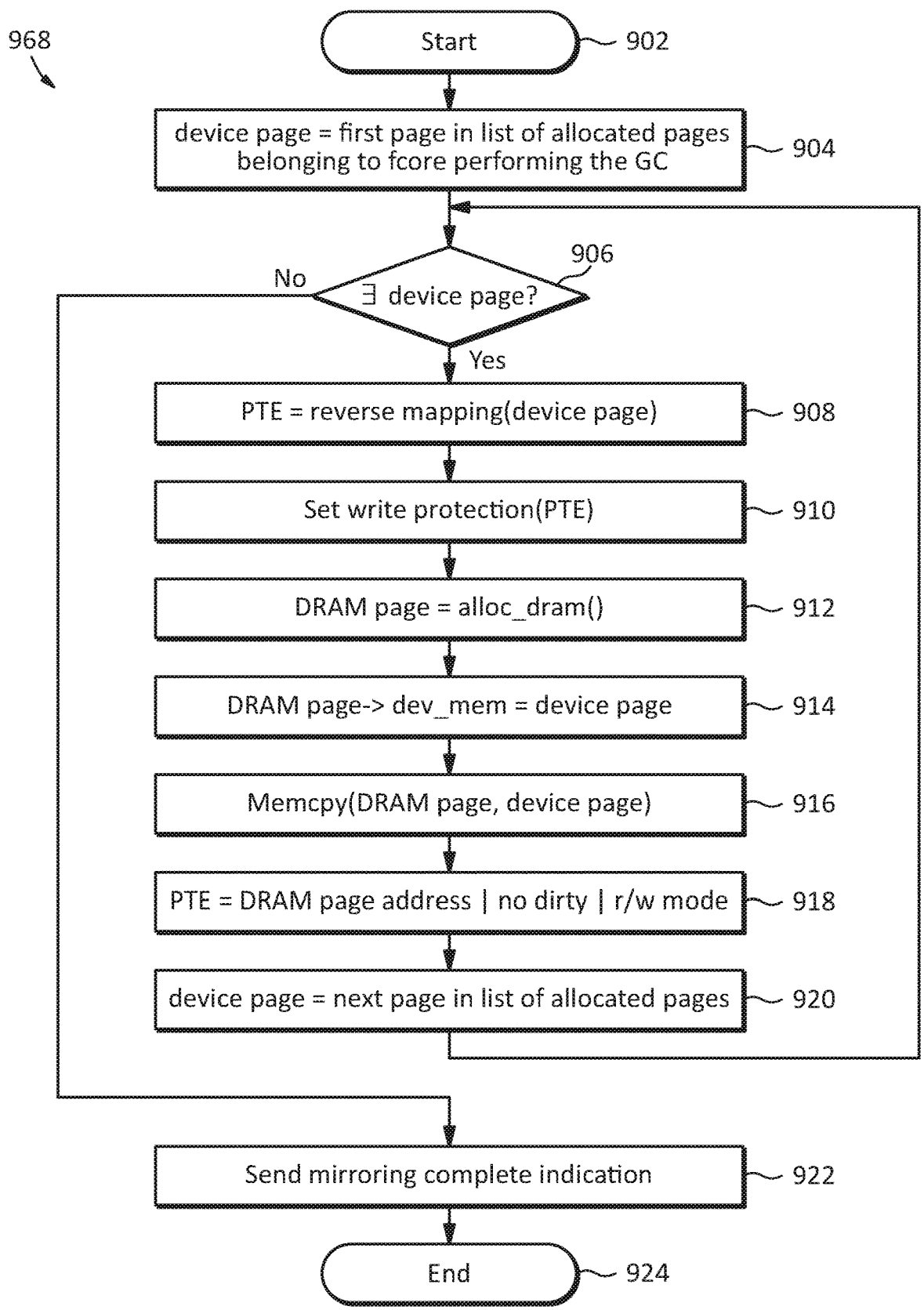
FIG. 9 illustrates an example embodiment of a page copying method in accordance with example embodiments of the disclosure.

The relocation logic 528 may continue the mirroring operation at a fifth operation (e.g., a page copying operation) 568 by copying the valid device pages 521a and 521b to the mirror memory pages 523a and 523b (e.g., in the host memory 518). An example embodiment of the page copying operation 568 is illustrated in FIG. 9 and described below. The page copying operation 568 may be implemented, for example, by the device driver 556. Upon completion of the page copying operation 568, the relocation logic 528 may perform a sixth operation 569 by remapping the valid device pages 521a and 521b from fcore 1 mem to the mirror memory pages 523a and 523b as shown by mapping 525.

In some embodiments, one or more of the fourth (allocation) operation 566, the fifth (copy) operation 568, and/or the sixth (remapping) operation 569 may be repeated (e.g., on a page-by-page basis) until some or all of the valid pages associated with the one or more target blocks 503a are mirrored to the host memory 518.

Upon completion of the final remapping operation 569, the relocation logic 528 may then perform a seventh operation 570 by sending an erase indication 571 to the SSD 500 informing the SSD 500 that the mirroring operation is complete and Fcore 1 may begin erasing the one or more target blocks 503a.

During the time that the valid pages are relocated to the mirror memory, it may be beneficial to prevent the memory allocator 550 from deallocating pages of the device memory 520 for Fcore 1 because, for example, one or more of the relocated pages may be copied back to the device memory 520 at the end of the garbage collection operation. However, if one or more of the relocated pages are deallocated by a process during the garbage collection operation, the memory allocator 550 may remap and/or move the deallocated relocated pages to the device memory 520 as shown by arrows 519. For this type of deallocated page, DRAM page→dev_mem as shown in FIG. 9 may have the device page information. In some embodiments, deallocating (which may also be referred to as freeing) a page may refer to returning the page to a pool of available memory.

If a valid page in mirror memory is updated (e.g., written) during the time the valid pages are relocated to the mirror memory, it may result in a dirty page. Thus, a dirty page bit may be set in a corresponding PTE for the page, for example, as described below with respect to FIG. 9.

If the virtual memory scheme 514 receives a request for a valid page in mirror memory during the time the valid pages are relocated to the mirror memory, the relocation logic 528 may invoke the host to handle the request using the page in the mirror memory rather than sending the request to the flash core performing the garbage collection operation. Depending on the implementation details, this may reduce or eliminate tail latency associated with queueing requests at a flash core during a garbage collection operation.

Referring to FIG. 7, the garbage collection operation may continue with an eighth operation 572 in which, based on receiving the erase indication 571, the modification logic 529 may allow Fcore 1 to proceed with erasing the one or more target blocks 503*a*. Fcore 1 may also record one or more valid page numbers from the one or more erased blocks.

As illustrated in FIG. 7, target blocks 503*a* may be indicated by diagonal shading and may include one or more valid pages and one or more invalid pages. Clean blocks 503*b* may be indicated without shading and may contain only blank pages. Valid blocks 503*c* may be indicated by solid shading and may include one or more valid pages, and the remaining pages, if any, may be blank.

Depending on the implementation details, the flash core 502 (e.g., Fcore 1) may erase the one or more target blocks 503*a* without copying valid pages to reserved space because the valid pages may have been relocated to mirror memory as described above, and thus, no reserved space may be used. Moreover, depending on the implementation details, no requests may be queued for the one or more valid pages in the one or more target blocks because, for example, requests for the one or more valid pages may be handled by the host while the valid pages reside in mirror memory.

At a ninth operation 574, the modification logic 529 may send a list 575 of PFNs for valid pages in the one or more erased blocks 503*a* to the relocation logic 528.

Referring to FIG. 8, after the erase operation, the previous target blocks may now be clean blocks with blank pages, some examples of which are identified as 503*b*. The garbage collection operation may continue at a tenth operation 576 at which the relocation logic 528 may obtain a list 577 of allocated pages belonging to the flash core conducting the garbage collection operation (in this example, Fcore 1).

Figure 11:
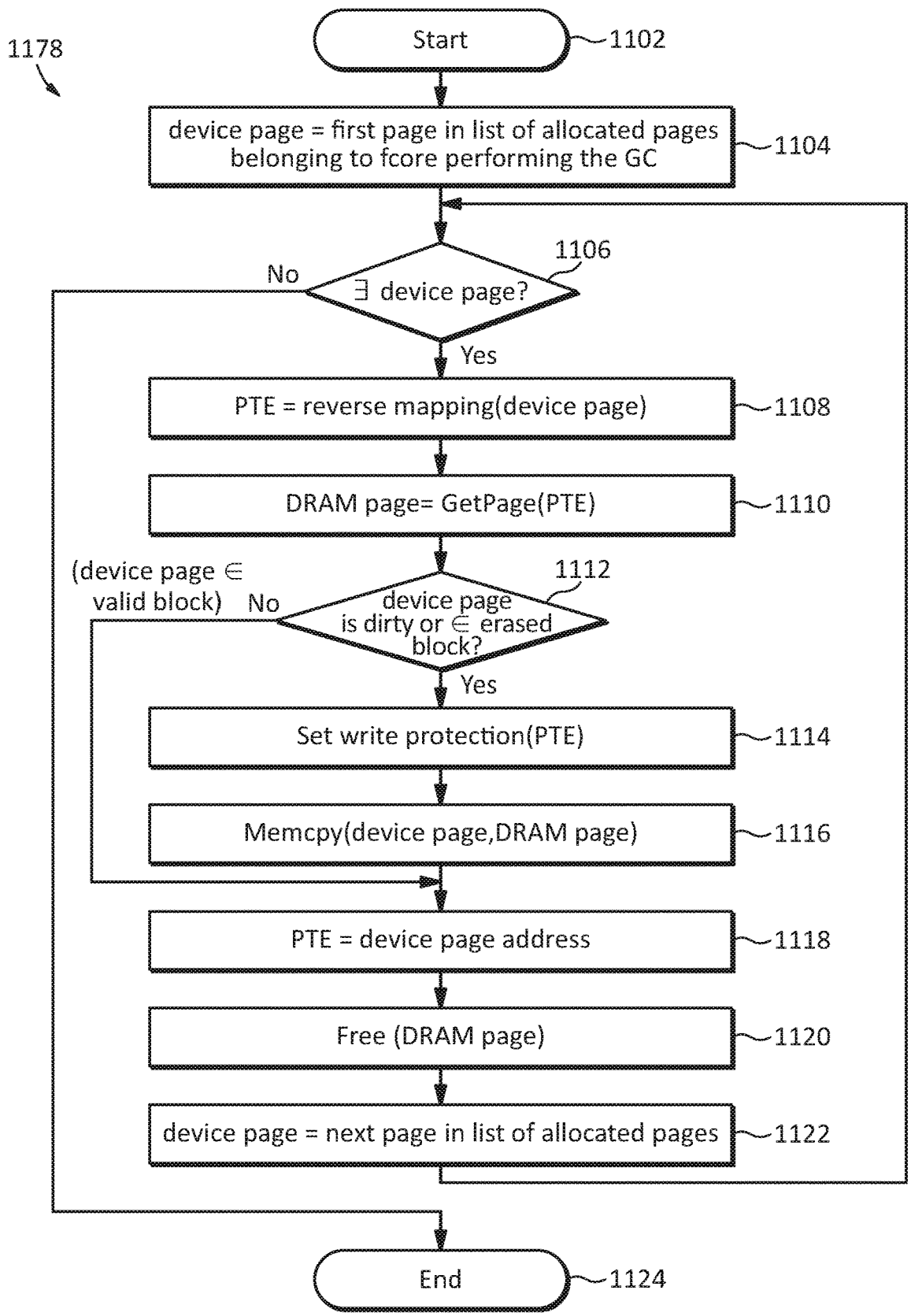
FIG. 11 illustrates an example embodiment of a page back method in accordance with example embodiments of the disclosure.

At an eleventh operation 578, the relocation logic 528 may copy back any dirty blocks and/or valid pages 581 from the mirror memory (e.g., host memory 518) to the device attached memory 520. Also at the eleventh operation 578, the virtual memory scheme 514 may remap the valid pages that had been relocated to mirror memory back to the device attached memory 520 as shown by mapping 527. In some embodiments, only dirty pages and/or valid pages belonging to an erased block may be remapped. In some embodiments, pages may be copied and/or remapped on a page-by-page basis. An example embodiment of the copy back operation 578 is illustrated in FIG. 11 and described below.

Upon completion of the copy back operation 578, Fcore 1 may return to normal operation until it accumulates enough invalid pages to initiate another garbage collection operation.

FIG. 9 illustrates an example embodiment of a page mirroring method in accordance with example embodiments of the disclosure. The page mirroring method 968 illustrated in FIG. 9 may be used, for example, to implement one or more of the fourth (allocation) operation 566, the fifth (copy) operation 568, and/or the sixth (remapping) operation 569 shown in FIG. 5.

Referring to FIG. 9, the method may begin at operation 902. At operation 904, the method may initiate a variable for a device page to the first page in a list of allocated pages belonging to the flash core that is performing the garbage collection operation. (Fcore 1 in the example illustrated in FIG. 5.) At operation 906, the method may determine if the device page exists. If the device page does not exist, the method may proceed to operation 922 where the method may send an indication to a storage device that the page mirroring operation is complete. The method may then end at operation 924.

If the method illustrated in FIG. 9 is used, for example, with the embodiment illustrated in FIG. 6, operation 922 may be implemented as operation 570 and send the indication 571 to the SSD 500.

Referring again to FIG. 9, if the page exists at operation 906, the method may proceed to operation 908 where the device page may be reverse mapped to the corresponding PTE. At operation 910, the method may apply write protection to the device page. At operation 912, a page of mirror memory (e.g., host DRAM) may be allocated for the device page. At operation 914, access to the device page may be set up. At operation 916, the page of device memory may be copied to the allocated page of mirror memory (e.g., host DRAM). At operation 918, the corresponding PTE may be updated, a dirty indicator bit may be cleared, and the write protection bit may be set for the page.

At operation 920, the method may move to the next device page in the list of allocated pages belonging to the flash core. The method may continue looping through operations 908, 910, 912, 914, 916, 918, and 920 until all pages in the list have been copied to the mirror memory (e.g., host DRAM). The method may then proceed to operation 922 as described above, and end at operation 924.

Figure 10:
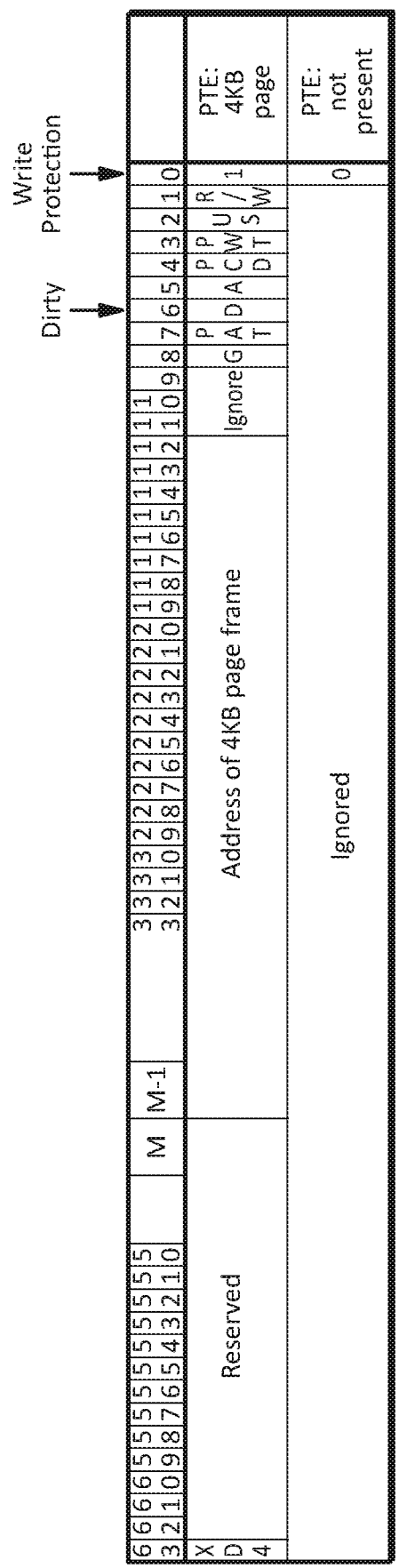
FIG. 10 illustrates an embodiment of a page table entry for use with a mirroring operation in accordance with example embodiments of the disclosure.

FIG. 10 illustrates an embodiment of a page table entry for use with a mirroring operation in accordance with example embodiments of the disclosure. The PTE illustrated may include 64 bits. A zero in bit position 0 may indicate that no entry is present and, therefore, the remainder of the PTE may be ignored. A one in bit position 0 may indicate a valid page entry in which bit position 1 may be set to write protect the page, and bit position 6 may indicate that the corresponding page is dirty (e.g., has been updated while the page resides in mirror memory during a garbage collection operation). The remaining bits may be used in any suitable manner, for example, in accordance with control register CR3 and/or Page-Structure Entries for Physical Address Extension (PAE) paging.

FIG. 11 illustrates an example embodiment of a page back method in accordance with example embodiments of the disclosure. The page copy back method 1178 illustrated in FIG. 11 may be used, for example, to implement the page copy back operation 578 shown in FIG. 8.

Referring to FIG. 11, the method may begin at operation 1102. At operation 1104, the method may initiate a variable for a device page to the first page in a list of allocated pages belonging to the flash core that is performing the garbage collection operation. (Fcore 1 in the example illustrated in FIG. 8.) At operation 1106, the method may determine if the device page exists. If the page does not exist, the method may then end at operation 1124.

If, at operation 1106, the device page exists, the method may proceed to operation 1108 where the device page may be reverse mapped to the corresponding PTE. At operation 1110, a mirror page (e.g., host DRAM page) corresponding to the device page may be fetched using the corresponding PTE. At operation 112, if the device page is a dirty page or belongs to an erased block, the method may proceed to operation 1114. If, however, the device page is not a dirty page and does not belong to an erased block, the method may proceed to operation 1118.

At operation 1114, the page may be write protected (e.g., by setting a write protect bit in the corresponding PTE. At operation 1116, the valid page in mirror memory (e.g., host DRAM) may be copied to the corresponding device page. At operation 1118, the PTE may receive the device page address. At operation 1120, the page of mirror memory (e.g., host DRAM) associated with the device page address may be freed. At operation 1122, the method may move to the next device page in the list of allocated pages belonging to the flash core. The method may continue looping through operations 1108, 1110, 1112, 1114, 1116, 1118, 1120, 1122, and 1106 until all pages in the list have been processed. The method may then end at operation 1124.

Figure 12:
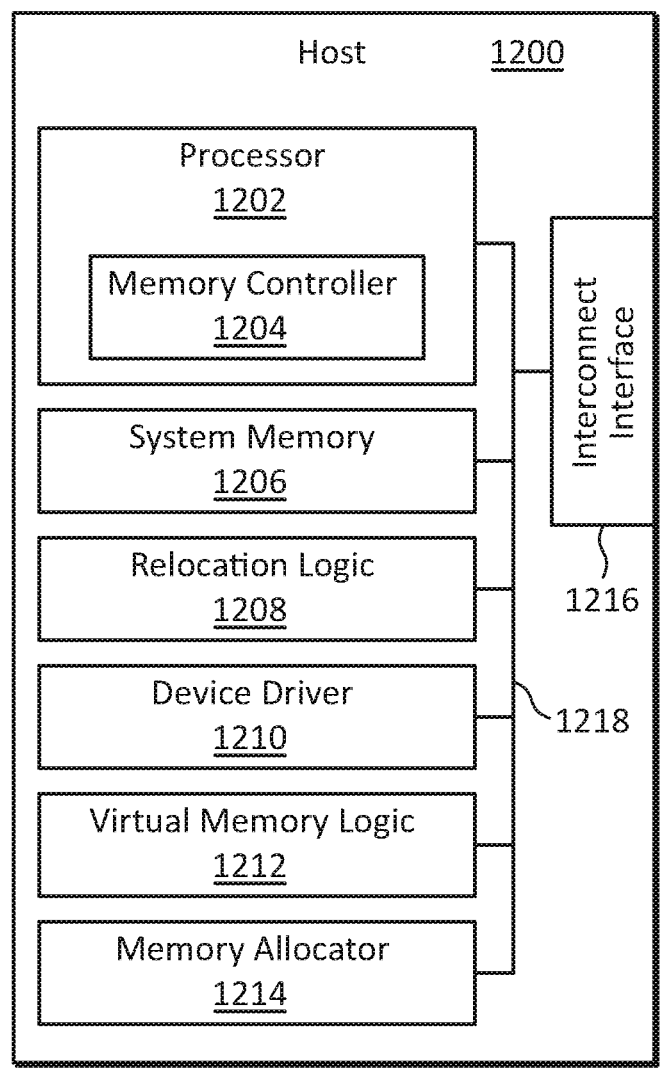
FIG. 12 illustrates an example embodiment of a host apparatus that may be used to implement a page relocation scheme for a garbage collection operation in accordance with example embodiments of the disclosure.

FIG. 12 illustrates an example embodiment of a host apparatus that may be used to implement a page relocation scheme for a garbage collection operation in accordance with example embodiments of the disclosure. The host apparatus 1200 illustrated in FIG. 12 may include a processor 1202, which may include a memory controller 1204, a system memory 1206, relocation logic 1208, a device driver 1210, virtual memory logic 1212, a memory allocator 1214, and/or a interconnect interface 1216, which may be implemented, for example using CXL. Any or all of the components illustrated in FIG. 12 may communicate through one or more system buses 1218. In some embodiments, the host apparatus 1200 illustrated in FIG. 12 may be used to implement any of the host functionality disclosed herein including processing, virtual memory mapping, valid page relocation, memory allocation, page mirroring, interrupt handling, copy back operations, and/or the like. In some embodiments, one or more of the components illustrated in FIG. 12 may be implemented using other components. For example, in some embodiments, one or more of the relocation logic 1208, device driver 1210, virtual memory logic 1212, and/or memory allocator 1214 may be implemented, for example, by the processor 1202 executing instructions stored in the system memory 1206 or other memory.

Figure 13:
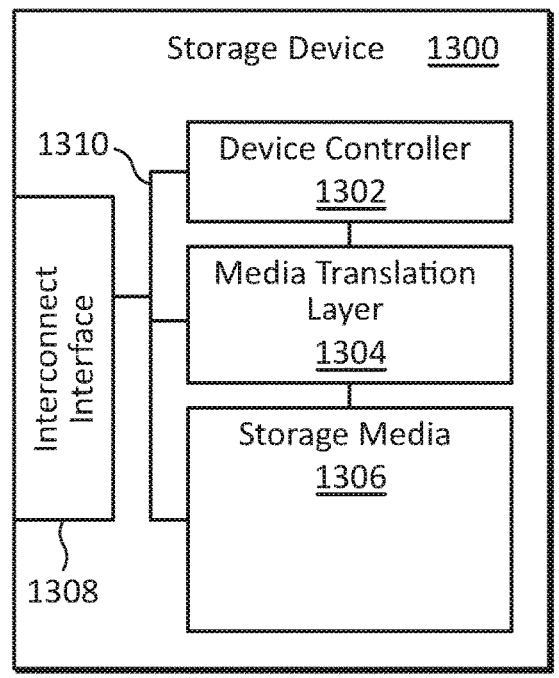
FIG. 13 illustrates an example embodiment of a storage device that may be used to implement a page relocation scheme for a garbage collection operation in accordance with example embodiments of the disclosure.

FIG. 13 illustrates an example embodiment of a storage device that may be used to implement a page relocation scheme for a garbage collection operation in accordance with example embodiments of the disclosure. The storage device 1300 may include a device controller 1302, a media translation layer 1304, a storage media 1306, and an interconnect interface 1308 that may be implemented, for example, with CXL. The components illustrated in FIG. 13 may communicate through one or more device buses 1310. In some embodiments that may use flash memory for some or all of the storage media 1306, the media translation layer 1304 may be implemented partially or entirely as a flash translation layer (FTL). In some embodiments, the storage device 1300 illustrated in FIG. 13 may be used to implement any of the device-side functionality relating to valid page relocation for garbage collection disclosed herein. For example, the device controller 1302 and/or media translation layer 1304 may be used to implement some or all of the modification logic, host cores, flash cores, and/or the like.

Any of the functionality described herein, including any of the host functionality, device functionally, and/or the like described with respect to FIGS. 1-13 may be implemented with hardware, software, or any combination thereof including combinational logic, sequential logic, one or more timers, counters, registers, state machines, volatile memories such as DRAM and/or static random access memory (SRAM), nonvolatile memory and/or any combination thereof, complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), and/or the like, executing instructions stored in any type of memory. In some embodiments, one or more components may be implemented as a system-on-chip (SOC).

Figure 14:
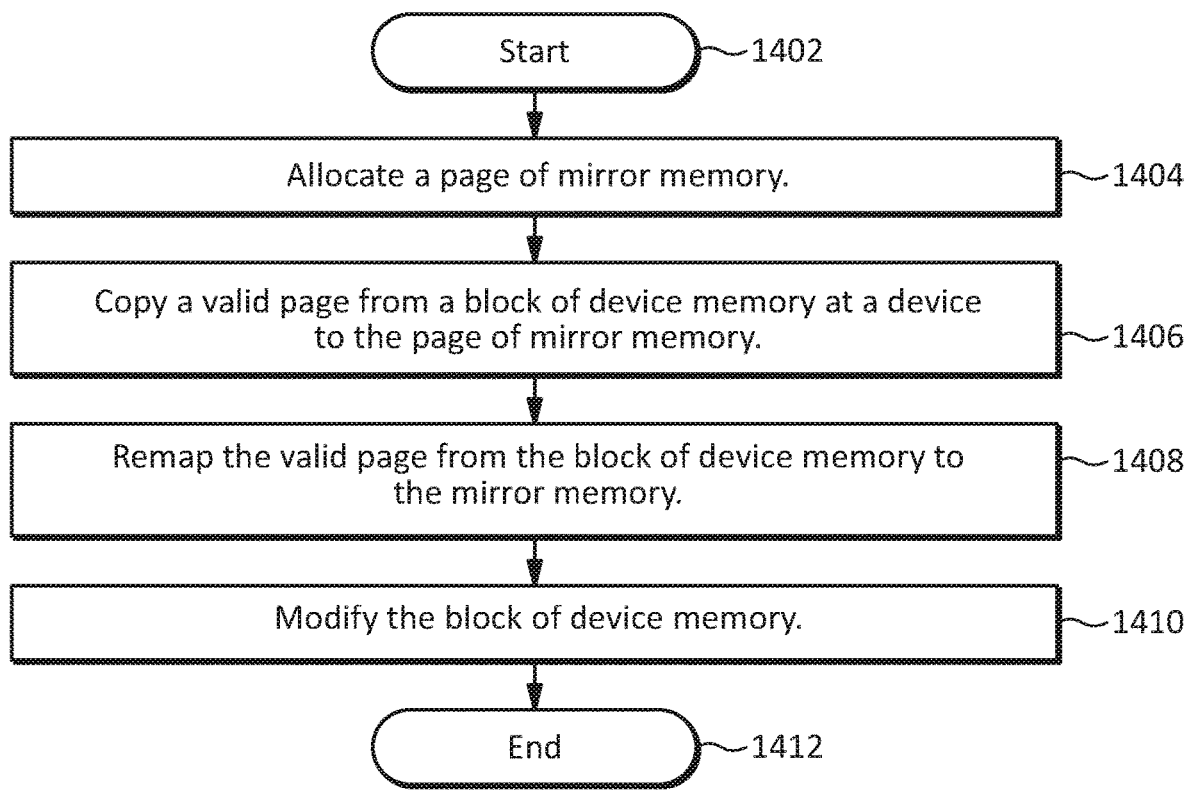
FIG. 14 illustrates an embodiment of a method for page management in a memory system operation in accordance with example embodiments of the disclosure.

FIG. 14 illustrates an embodiment of a method for page management in a memory system operation in accordance with example embodiments of the disclosure. The method may begin at operation 1402. At operation 1404, the method may allocate a page of mirror memory. The page may be allocated, for example, in a system memory such as host memory, in a storage device, and/or the like. At operation 1406, the method may copy a valid page from a block of device memory at a device to the page of mirror memory. At operation 1408, the method may remap the valid page from the block of device memory to the mirror memory. In some embodiments, the valid page may be remapped through a memory coherent interface. At operation 1410, the method may modify (e.g., erase) the block of device memory. The block of device memory may be erased, for example, as part of a garbage collection operation. The method may end at operation 1412.

The embodiment illustrated in FIG. 14, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
   copying a valid page from a block of device memory at a device to a page of mirror memory;
   mapping the valid page from the block of device memory to the mirror memory;
   modifying, based on the copying the valid page, an availability of the block of device memory;
   receiving a request for an access of the valid page; and
   accessing, at the mirror memory, based on the mapping and the request, the valid page; and
   copying, based on the modifying, from the mirror memory to the device memory, the valid page.

2. The method of claim 1, further comprising:
   mapping the valid page from the mirror memory to the device memory.

3. The method of claim 2, wherein the mapping the valid page from the mirror memory to the device memory is performed using a memory coherent interface.

4. The method of claim 2, further comprising freeing a portion of the mirror memory associated with the valid page based on copying the valid page from the mirror memory.

5. The method of claim 1, further comprising:
   updating the valid page in the mirror memory to generate a modified page in the mirror memory;
   copying the modified page from the mirror memory to the device memory; and
   mapping the modified page to the device memory.

6. The method of claim 1, wherein the valid page is associated with a process at a host, the method further comprising freeing, by the process, the valid page from the mirror memory.

7. The method of claim 1, wherein the mirror memory comprises system memory.

8. The method of claim 1, wherein:
   the device is a first device; and
   the mirror memory comprises a memory at a second device.

9. The method of claim 1, wherein:
   the valid page comprises a valid page of a first memory of a first processing element of the device; and
   the mirror memory comprises a second memory of a second processing element of the device.

10. The method of claim 1, further comprising allocating based on an indication from the device, the page of the mirror memory.

11. The method of claim 10, wherein the indication comprises an interrupt from the device to a device driver.

12. A system comprising:
    a storage device comprising a block of memory;
    a first circuit configured to:
       send a notification based on a first page having a first validity status and a second page having a second validity status in the block of memory;
       receive an indication; and
       modify the block of memory based on the indication;
    a mirror memory; and
    a second circuit configured to:
       receive the notification from the first circuit;
       copy the first page to the mirror memory based on the notification;
       map the first page to the mirror memory; and
       send the indication to the first circuit.

13. The system of claim 12, wherein:
    the first circuit is further configured to send a valid page list to the second circuit; and
    the second circuit is further configured to:
       copy the first page from the mirror memory to a free page at the storage device based on the valid page list; and
       map the first page from the mirror memory to the free page at the storage device.

14. The system of claim 13, further comprising a device driver configured to:
    copy the first page from the block of memory to the mirror memory; and
    copy the first page from the mirror memory to the free page of the storage device.

15. The system of claim 12, further comprising a memory allocator configured to:
    redirect, based on the notification, a memory allocation for a processing element of the storage device associated with the block of memory; and
    provide to the storage device, based on the notification, a list of pages allocated to the processing element of the storage device.

16. A storage device comprising:
    a block of memory; and
    a circuit configured to:
       send a notification based on a first page having a first validity status and a second page having a second validity status in the block of memory;
       receive an indication; and
       perform a modification operation on the block of memory based on the indication.

17. The storage device of claim 16, wherein the circuit is configured to communicate with a host using a coherent memory interface.

18. The storage device of claim 16, wherein the circuit is configured to send a valid page list based on the modification operation.

19. The storage device of claim 16, wherein:
    the block of memory is a first block of memory;
    the storage device comprises:
       a first processing element configured to control the first block of memory and a second block of memory; and
       a second processing element configured to control a third block of memory; and the circuit is configured to perform, by the first processing element, the modification operation on the first block of memory and the second block of memory based on the indication.

* * * * *